(12) United States Patent
Duncan, IV (10) Patent No.: US 12,112,412 B1
(45) Date of Patent: Oct. 8, 2024

(54) PROCESS FOR DEFINING A DIGITAL LANGUAGE THAT DESCRIBES STYLISTIC INTENT ACROSS IMAGE FILES AND WHICH IS IMPLEMENTED AS PART OF AN IMAGE AND BRAND STYLE SYSTEM

(71) Applicant: Charles Hamilton Duncan, IV, Studio City, CA (US)

(72) Inventor: Charles Hamilton Duncan, IV, Studio City, CA (US)

(73) Assignee: Optikka Inc., Studio City, CA (US)

( * ) Notice: Subject to any disclaimer, the term of this patent is extended or adjusted under 35 U.S.C. 154(b) by 196 days.

(21) Appl. No.: 17/744,442

(22) Filed: May 13, 2022

Related U.S. Application Data (60) Provisional application No. 63/188,336, filed on May 13, 2021.

(51) Int. Cl.
*G06T 11/60* (2006.01)
*G06F 16/16* (2019.01)
*G06F 18/22* (2023.01)
*G06T 7/00* (2017.01)

(52) U.S. Cl.
CPC .......... *G06T 11/60* (2013.01); *G06F 16/164* (2019.01); *G06F 18/22* (2023.01); *G06T 7/97* (2017.01)

(58) Field of Classification Search
CPC ......... G06T 11/60; G06T 7/0002; G06T 7/97; G06F 16/164; G06F 18/22
See application file for complete search history.

(56) References Cited

U.S. PATENT DOCUMENTS

| | | | |
|---|---|---|---|
| 9,626,080 B1* | 4/2017 | Labaj | G06F 3/00 |
| 10,068,179 B2* | 9/2018 | O'Donovan | G06T 11/001 |
| 10,296,308 B2* | 5/2019 | Lance | G06F 8/30 |
| 2020/0394235 A1* | 12/2020 | Liu | G06F 16/958 |
| 2020/0410730 A1* | 12/2020 | Wilensky | G06T 7/97 |

\* cited by examiner

*Primary Examiner* — Jin Cheng Wang
(74) *Attorney, Agent, or Firm* — Plager Schack LLP; Mark H. Plager, Esq.; Stephen Hallberg, Esq.

(57) ABSTRACT

A digital language and a process for defining a digital language are disclosed to describe stylistic intent across multiple image files. The digital language is implemented as part of an image and brand style system for defining, selecting, manipulating, and combining digital images by using inference from each image's self-declaring, stylistic, visual role among a communal group, that can be expressed at the file level itself, from the point of inception, and is resilient from pixel transformation while remaining agnostic of creative tool, thereby allowing any delivery medium to change the visual style of the images without the loss of aesthetics. This results in the ability to change multiple images and branded works using a new and consistent style/palette.

8 Claims, 6 Drawing Sheets

PROCESS FOR DEFINING A DIGITAL LANGUAGE THAT DESCRIBES STYLISTIC INTENT ACROSS IMAGE FILES AND WHICH IS IMPLEMENTED AS PART OF AN IMAGE AND BRAND STYLE SYSTEM

CLAIM OF BENEFIT TO PRIOR APPLICATION

This application claims benefit to U.S. Provisional Patent Application No. 63/188,336, entitled "PROCESS FOR DEFINING A DIGITAL LANGUAGE THAT DESCRIBES STYLISTIC INTENT ACROSS IMAGE FILES AND WHICH IS IMPLEMENTED AS PART OF AN IMAGE AND BRAND STYLE SYSTEM," filed May 13, 2021. The U.S. Provisional Patent Application No. 63/188,336 is incorporated herein by reference.

BACKGROUND

Embodiments of the invention described in this specification relate generally to digital image, graphics software and graphics renderers, typically used by creative businesses who make digital content (may be digitally captured, developed or hand drawn), and more particularly, to a digital language, a process for defining a digital language, and an image and brand style system in which the digital language describes stylistic intent across multiple image files.

The means to quickly apply a consistent, stylized, branded look across a plurality of pixel-based images is constrained by the digital storage of image information available at the pixel level. Due to this constraint, images cannot intelligently or automatically blend into their parent product while remaining aesthetically appropriate. This can be observed by changing the background color of a well-branded website which leaves the images unchanged, and now visually disconnected as distinct squares. For example, rasterized digital images are static and cannot inherit the stylistic palette of the medium (e.g., a website page) that they are delivered in. Accordingly, changing the background color of the website page has no effect on the image displayed on the background.

The constraint of pixel-based information can also be found when trying to apply a consistent texture across multiple images created by different artists; forcing many to try and deconstruct the pixel information in an attempt to decipher the base aesthetic elements. However, once pixel information from one image is combined with another, there is an immutable loss of information. Yet, the existing conventional digital tools for deconstructing the elements of an image try and look at a finished image, and then deconstruct, top down, in a manner to unravel what is in the image. Also, the existing conventional creative tools for composing images typically force the designer to commit to a style early in the design cycle; where the application of colors and overall style is done one image at a time.

Additionally, attempting to supplement pixel data by adding metadata information into a digital file (e.g., XMP/EXIF) becomes vulnerable, and is lost when a work is manipulated/enriched across image processing applications or transformed (compressed) in preparation to be delivered into a product (website). As a result, software applications often employ the use of a database, where additional information about the image is stored. This disconnects the information from the actual image. As a result of disconnecting such required information from the file itself, the file is not easily sharable with other enrichment or delivery systems.

Current methods use generic file naming (e.g., generic descriptor names or instructional-type names) that attempts to inform viewers of such required information (e.g., 'whiteEyeBall.jpg' for example, or base instructions for re-assembly such as: layer1.gif, layer2.gif, etc.) lack the ability to adequately describe stylistic intent across multiple bodies of visual work and, thus, lose relevance when attempting to be employed across a plurality of otherwise unrelated images for the means of (dynamically) applying a consistent style or visually incorporating them into the palette of their host products.

Due to these limitations, creative agencies are typically left with the burden of requiring artists to manually intervene and recreate artwork at the pixel level to adhere to a newly desired branded style.

Therefore, what is needed is a way to describe stylistic intent across multiple image files in a way that easily and effectively provides a mechanism to render changes to the stylistic intent.

BRIEF DESCRIPTION

A novel digital language, a process for defining a digital language, and an image and brand style system in which the digital language describes a stylistic intent across multiple image files are disclosed. In some embodiments, the image and brand style system provides the digital language as a universally digestible language to describe the stylistic intent in a way that goes beyond single pixel expressions of the stylistic intent. By integrating this universal digital language, the image and brand style system provides the ability for the image delivery medium to change the visual style without loss of aesthetics. As such, the digital language, the process for defining the digital language, and the image and brand style system provides a way to change multiple images and branded works using a new and consistent style/palette.

In some embodiments, the image and brand style system enables users with visual impairment to create color and style schemes. In some embodiments, the image and brand style system assists visually impaired viewers of web content to better see the image content on website pages. In some embodiments, the process comprises a stylistic intent image collection definition process for defining and using a digital language to publish an image collection of an intended stylistic aesthetic. In some embodiments, the stylistic intent image collection definition process for defining and using a digital language to publish an image collection of an intended stylistic aesthetic comprises (i) authoring an image collection using a generic style, (ii) identifying the strategic style elements in the authored image collection, (iii) separating strategic style elements in the authored image collection, (iv) naming the separate elements in the authored image collection using a desired language dialect, (v) receiving input to change the generic style, (vi) changing the generic style based on the received input, (vii) outputting (or displaying) a visual result of the changed style, (viii) determining whether a desired aesthetic is achieved by the change in the generic style, and (ix) publishing a newly branded collection when the desired aesthetic is achieved.

In some embodiments, the digital language, the process for defining the digital language, and the image and brand style system preserves, and is aware of, an artist's visual intent through an expression of the stylistic intent via the digital language. Images with such stylistic intent coded via the digital language can intelligently respond to changes in product-based branding. Such images can be dynamically re-drawn with additional visual characteristics to create a consistent, stylized look that can visually unify an entire brand of images.

In some embodiments, the digital language, the process for defining the digital language, and the image and brand style system establishes a digital, stylistic-language based on an inferable data model that is collectively defined across a plurality of digital image files. Each image contributes a part of the collective definition and declares its own visual role. In some embodiments, the digital language and the process for defining the digital language defines an aggregated visual role ("aggregated role definition") as an aggregate of style and file information comprising pixel information, an image file name, and a shared dialect that is used by otherwise unrelated images that represent different works.

In some embodiments, the process for defining the digital language starts the declaration of a digital language (or "dialect") when an image is introduced into a community of images and can be retained and enhanced as the pixel information is manipulated by common image processing software found throughout the creative industry.

In some embodiments, the digital language's ability to describe the artist's visual intent as basic brand guidelines, across multiple rounds of refinement, and across various collection combinations enables the entire lineage of an image's history to be re-constructed from the point of inception to match a newly desired style; thus conforming its variation or differentiating its variation relative to other images in the collection that share the same communal language (dialect).

In some embodiments, the process for defining a digital language enables Style, Output, Control, and Model (SOCM) aspects in an image and brand style system in which the digital language universally describes stylistic intent across multiple image files to enable an image delivery medium to change visual style across all images and branded content using a new and consistent style/palette without a loss of aesthetics. The process for defining the digital language that enables SOCM aspects in the image and brand style system comprises (i) specifying characteristics of a visual image of a collection using an image processing application, (ii) identifying stylistic elements of the visual image, (iii) saving a separate element file for each identified stylistic element, (iv) determining a suitable file naming convention, (v) updating the file name of each separate element file according to the suitable file naming convention, (vi) providing, by one of distributing and uploading, a group of files to at least one of a product and a website, wherein the group of files comprises the separate element files for the identified stylistic elements, (vii) applying each of the steps for specifying characteristics, identifying stylistic elements, saving the separate element file, determining the file naming convention, updating the file name, and providing the group of files to a plurality of other visual images of the collection, (viii) displaying all of the visual images according to a stylistic intent, said visual images all displayed in a website and/or a digital product, (ix) changing a desired style definition for the collection of images, and (x) repeating the step for changing the desired style definition as needed by visual design requirements.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are highlighted. However, it will be clear and apparent to one skilled in the art that the invention is not limited to the embodiments set forth and that the invention can be adapted for any of several applications.

Some embodiments of the invention include a novel digital language, a process for defining the digital language, and an image and brand style system in which the digital language describes a stylistic intent across multiple image files. In some embodiments, the image and brand style system provides the digital language as a universally digestible language to describe the stylistic intent in a way that goes beyond single pixel expressions of the stylistic intent. By integrating this universal digital language, the image and brand style system provides the ability for the image delivery medium to change the visual style without loss of aesthetics. As such, the digital language, the process for defining the digital language, and the image and brand style system provides a way to change multiple images and branded works using a new and consistent style/palette.

In some embodiments, the image and brand style system enables users with visual impairment to create color and style schemes. In some embodiments, the image and brand style system assists visually impaired viewers of web content to better see the image content on website pages. For example, if a user selects an option in the browser to render text and content in a way that is sensitive to the needs of visual impairment, this will presently result in an increase in contrast for text and background, but will leave images the same. However, by utilizing the image and brand style system of the present disclosure, the web user (say, one with visual impairment) who selects this browser option will also have the images defined by the language with stylistic intent to be toned down (or more pixelated, better contrast in color, etc.), as defined by the language for the stack of images (layers) on the page.

In some embodiments, the process comprises a stylistic intent image collection definition process for defining and using a digital language to publish an image collection of an intended stylistic aesthetic. In some embodiments, the stylistic intent image collection definition process for defining and using a digital language to publish an image collection of an intended stylistic aesthetic comprises (i) authoring an image collection using a generic style, (ii) identifying the strategic style elements in the authored image collection, (iii) separating strategic style elements in the authored image collection, (iv) naming the separate elements in the authored image collection using a desired language dialect, (v) receiving input to change the generic style, (vi) changing the generic style based on the received input, (vii) outputting a visual result of the changed style, (viii) determining whether a desired aesthetic is achieved by the change in the generic style, and (ix) publishing a newly branded collection when the desired aesthetic is achieved.

In some embodiments, the digital language, the process for defining the digital language, and the image and brand style system preserves, and is aware of, an artist's visual intent through an expression of the stylistic intent via the digital language. Images with such stylistic intent coded via the digital language can intelligently respond to changes in product-based branding. Such images can be dynamically re-drawn with additional visual characteristics to create a consistent, stylized look that can visually unify an entire brand of images.

In some embodiments, the digital language, the process for defining the digital language, and the image and brand style system establishes a digital, stylistic-language based on an inferable data model that is collectively defined across a plurality of digital image files. Each image contributes a part of the collective definition and declares its own visual role. In some embodiments, the digital language and the process for defining the digital language defines an aggregated visual role ("aggregated role definition") as an aggregate of style and file information comprising pixel information, an image file name, and a shared dialect that is used by otherwise unrelated images that represent different works.

In some embodiments, the process for defining the digital language starts the declaration of a digital language (or "dialect") when an image is introduced into a community of images and can be retained and enhanced as the pixel information is manipulated by common image processing software found throughout the creative industry.

In some embodiments, the digital language's ability to describe the artist's visual intent as basic brand guidelines, across multiple rounds of refinement, and across various collection combinations enables the entire lineage of an image's history to be re-constructed from the point of inception to match a newly desired style; thus conforming its variation or differentiating its variation relative to other images in the collection that share the same communal language (dialect).

In some embodiments, the process for defining a digital language enables Style, Output, Control, and Model (SOCM) aspects in an image and brand style system in which the digital language universally describes stylistic intent across multiple image files to enable an image delivery medium to change visual style across all images and branded content using a new and consistent style/palette without a loss of aesthetics. The process for defining the digital language that enables SOCM aspects in the image and brand style system comprises (i) specifying characteristics of a visual image of a collection using an image processing application, (ii) identifying stylistic elements of the visual image, (iii) saving a separate element file for each identified stylistic element, (iv) determining a suitable file naming convention, (v) updating the file name of each separate element file according to the suitable file naming convention, (vi) providing, by one of distributing and uploading, a group of files to at least one of a product and a website, wherein the group of files comprises the separate element files for the identified stylistic elements, (vii) applying each of the steps for specifying characteristics, identifying stylistic elements, saving the separate element file, determining the file naming convention, updating the file name, and providing the group of files to a plurality of other visual images of the collection, (viii) displaying all of the visual images according to a stylistic intent, said visual images all displayed in a website and/or a digital product, (ix) changing a desired style definition for the collection of images, and (x) repeating the step for changing the desired style definition as needed by visual design requirements.

As stated above, rasterized digital images are static and cannot inherit the stylistic palette of the medium (e.g., a website page) that they are delivered in. As such, changing the background color of the website page has no effect on the image displayed on the background. Existing digital tools that attempt to deconstruct the elements of an image by trying to look at a finished image (e.g., a green pixel), and deconstruct, top down, in an attempt to unravel what is in the image, have no way of knowing the original stylistic intent behind the composite of the image (e.g., the green pixel arising as a result of a combination of a yellow pixel and a blue pixel). Alternately, many of the existing creative tools that compose rasterized images seem to force a designer to commit to a style early in the design cycle. This has the effect of requiring the designer to apply colors and overall style refinements of a collection in a piecemeal manner—i.e., one image at a time. Embodiments of the digital language, the process for defining the digital language, and the image and brand style system described in this specification solve such problems by allowing rasterized images to intelligently conform to a style of an environment in which the images are presented. In other words, embodiments of the digital language enable a way for multiple images to morph visually in accordance with the style or updated style, and to account for the overall color of the page/product while respecting the original stylistic intent.

Embodiments of the digital language, the process for defining the digital language, and the image and brand style system described in this specification differ from and improve upon currently existing options. In particular, some embodiments differ from conventional image systems in which digital media is typically presented in a single style (e.g., green palette) and the images are built in a static manner for that palette. Attempts to deconstruct a final image is limited to the information in a single pixel; and so they cannot infer the original stylistic intent. Furthermore, the existing conventional systems cannot allow designers to morph the final product down to the pixel of a rasterized image while maintaining acceptable aesthetics across a branded collection. By contrast, the digital language, the process for defining the digital language, and the image and brand style system of the present disclosure provides a universally digestible language that describes the stylistic intent of an image beyond the single pixel (e.g., yellow plus blue); therefore allowing the delivery medium to change the visual style without the loss of aesthetics. The result is an ability to change a plurality of images and branded works using a new and consistent style/palette (e.g., red plus blue). As such, the digital language and image and brand style system allows all the images of a brand to change if the style of the medium changes (e.g., purple palette).

The digital language, the process for defining the digital language, and the image and brand style system of the present disclosure may be comprised of the following elements and process steps. This list of possible constituent elements and process steps is intended to be exemplary only and it is not intended that this list be used to limit the digital language, the process for defining the digital language, and the image and brand style system of the present application to just these elements or only these process steps. For instance, another process with another set of process steps is described below, by reference to FIG. 1. Furthermore, persons having ordinary skill in the art relevant to the present disclosure may understand there to be equivalent elements and/or equivalent or similar process steps that may be substituted within the present disclosure without changing the essential function or operation of digital language (how it is defined and used), the process for defining the digital language, and the image and brand style system.

1. Author the characteristics of the visual image using any image processing application
2. Identify the stylistic elements that make up the visual image
3. Save a file for each stylistic element
4. Determine the correct file naming convention
5. Update the file name of each file using the naming convention
6. Distribute or upload the group of files to the product or website
7. Repeat steps 1-6 for all visual works of a collection
8. Display all the visual images using the software code as provided, either in
a website or digital product
9. Change the desired style definition for the visual design
10. Repeat step 9 to iterate the visual design as desired The various elements of the digital language, the process for defining the digital language, and the image and brand style system of the present disclosure may be related in the following exemplary fashion. It is not intended to limit the scope or nature of the relationships between the various elements and the following examples are presented as illustrative examples only. During or after authoring the visual image (step 1) each visual element is strategically identified (step 2) that collectively makes up the core of the work. The core elements are then defined by saving each element separately (step 3). By repeating this process for all the works within the stylistic brand (step 10), a common naming convention is defined (step 4) that can cross-correlate elements from different works. Once the individual element names are updated (step 5) the software renderer can then dynamically modify the style (steps 6-9). Additional adjustments can then be made by going back to steps 1-3 to enable greater stylistic range.

The digital language, the process for defining the digital language, and the image and brand style system of the present disclosure generally works by editing a collection of images or, works of a brand, simultaneously; refining a visually pleasing look while various colors and textures are changed within each image. This enables a creative director to apply broad style changes across a collection to render a new or different look. This is made possible because each element is isolated and identified in a manner that is relative to all the other images in the collection. Thus, a consistent brand change is easily controlled. The pattern can be labeled as "Style", "Output", "Control", and "Model" (SOCM). The image Style is authored by the composer of the work. The work is able to be Output to another medium (email, website page, etc.). Existing software programs and systems do not provide the full package of SOCM aspects that are provided by the digital language, the process for defining the digital language, and the image and brand style system. Instead, most conventional existing software/systems only offer Style and Output aspects of the SOCM. Thus, the digital language, the process for defining the digital language, and the image and brand style system described in this specification is unique in being able go beyond merely providing Style and Output, by also providing the Control and Model aspects. Specifically, global Control is provided to allow the entire collection to be manipulated; which is made possible by utilizing a data Model. As the content author, composer, or user sees the plurality of images dynamically change across various style combinations, they can choose to refine the number of elements, and the naming convention used to cross-correlate multiple works within a given brand. For instance, the composer may start with at least one visual element (Style). An image renderer (Output) can be deployed and used to composite several images according to specified rules (Model) that reside in the file names. The image and brand style system provides management functions that allow the user to manage different style variations (Control).

Figure 1:
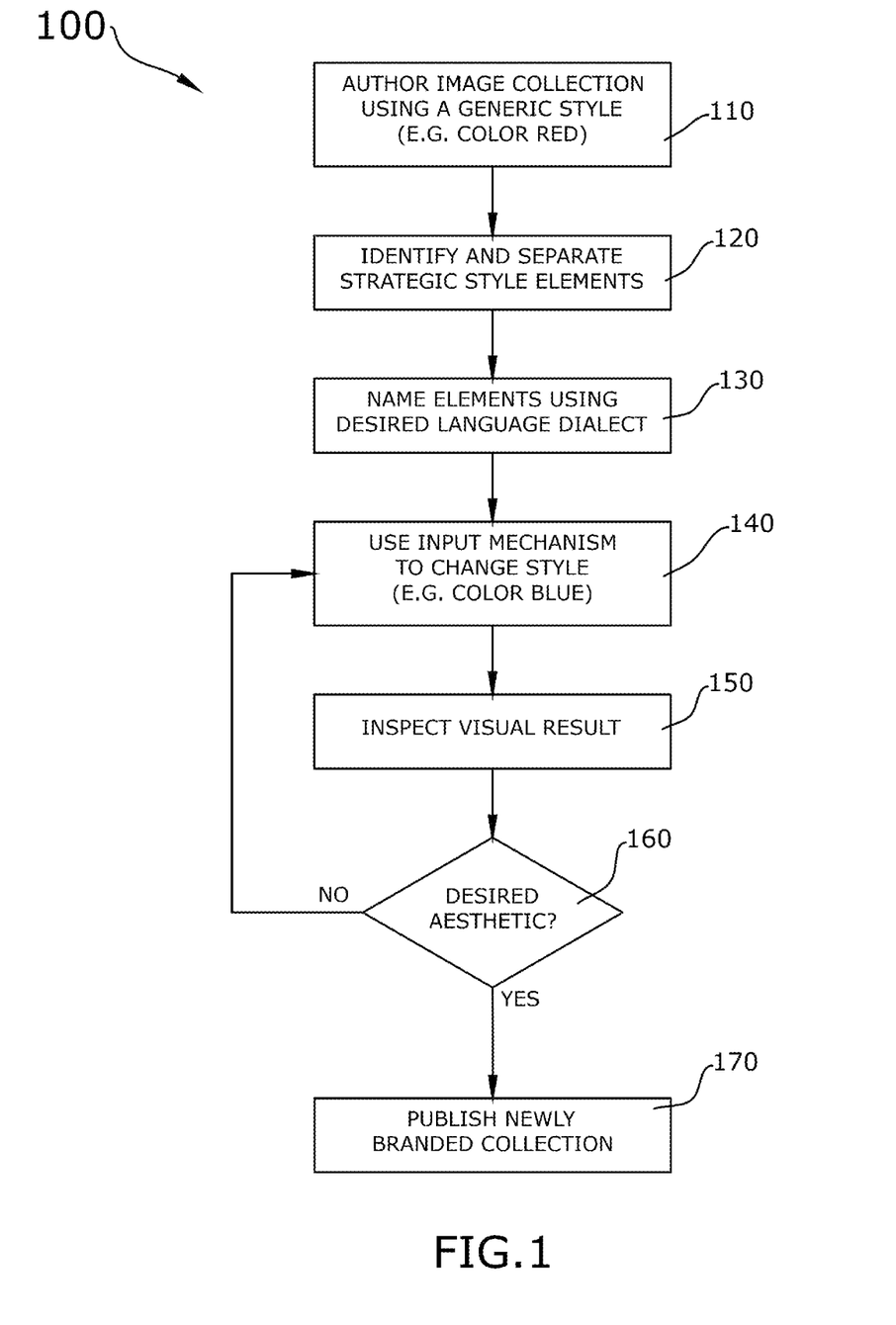
FIG. 1 conceptually illustrates a stylistic intent image collection definition process for defining and using a digital language to publish an image collection of an intended stylistic aesthetic in some embodiments.

By way of example, FIG. 1 conceptually illustrates a stylistic intent image collection definition process 100 for defining and using a digital language to publish an image collection of an intended stylistic aesthetic in some embodiments. As shown in this figure, the stylistic intent image collection definition process 100 starts with a step for authoring an image collection using a generic style (at 110). For example, the color red being the generic style. Next, the stylistic intent image collection definition process 100 includes a step to identify and separate strategic style elements (at 120) which is followed by a step to name the separate elements using a desired language dialect (at 130).

In some embodiments, the stylistic intent image collection definition process 100 proceeds to a step for using an input mechanism to change the style (at 140). For example, changing the generic style from the color red to the color blue. After the change in style, the stylistic intent image collection definition process 100 proceeds to a step of inspecting the visual result (at 150). For example, the user inspects the visual output of an item in the generic style (color red) followed by making the change in style (to the color blue), which is then visually output for viewing by the user. Of course, the user may wish to view several or even all of the images in the collection before deciding whether the desired aesthetic has been achieved. In that case, it is simple for the user to just open/access each image (or all images) in the collection for inspection, since the change in style would have been applied over all of the images in the collection.

If the user does not like the change in style, then it is possible to go back to try the change in style again. Thus, the stylistic intent image collection definition process 100 determines (at 160) whether the desired aesthetic has been achieved by the change in style or not. When the desired aesthetic is not achieved ('NO'), the stylistic intent image collection definition process 100 transitions back to the step at which the user makes the change in style by using the input mechanism to change style (at 140), and continues onward as described above. On the other hand, when the desired aesthetic is affirmatively achieved ('YES'), then the stylistic intent image collection definition process 100 proceeds to a final step for publishing the newly branded collection (at 170). Then the stylistic intent image collection definition process 100 ends. Naturally, the user may wish to make image collections with varying styles or may have other image collections in which to make stylistic changes, in which case the user would go through the stylistic intent image collection definition process 100 again for each collection. There is an exception in that the user may skip one or more of the steps, namely, authoring a new image collection (at 110), identifying and separating style elements (at 120), and naming the elements in language dialect of choice (at 130) when applying a stylistic change to an existing image collection that is previously created, saved, and presently opened.

Additionally, it is possible to leverage machine learning and artificial intelligence to read the image files, cross-correlate them to the file names, and then compare against the full image collection. In some embodiments, one or more machine learning and AI modules enhance automated processing steps or other aspects of the system. Furthermore, the images, along with their file names, could be tied together in a lineage chain that would serve as the record from inception to current variation. This lineage information could also be used by computer technology to further automate the process.

In some embodiments, the digital language, the process for defining the digital language, and the image and brand style system can be leveraged to create additional, derivative languages for the purpose of further enriching the value of the content. In one such example, a new translation of the language could be created and correlated with the popularity of a given style variation to determine which combinations have greater value.

Communal/Familial Structure.

In some embodiments, the digital language, the process for defining the digital language, and the image and brand style system starts with establishment of a structured, communal dialect. The communal dialect is structured, for example, by way of a single file which represents a base 'person' of a community. Within the community, each 'person' declares its origin, which is described in relation to other 'persons' in the community.

Figure 2:
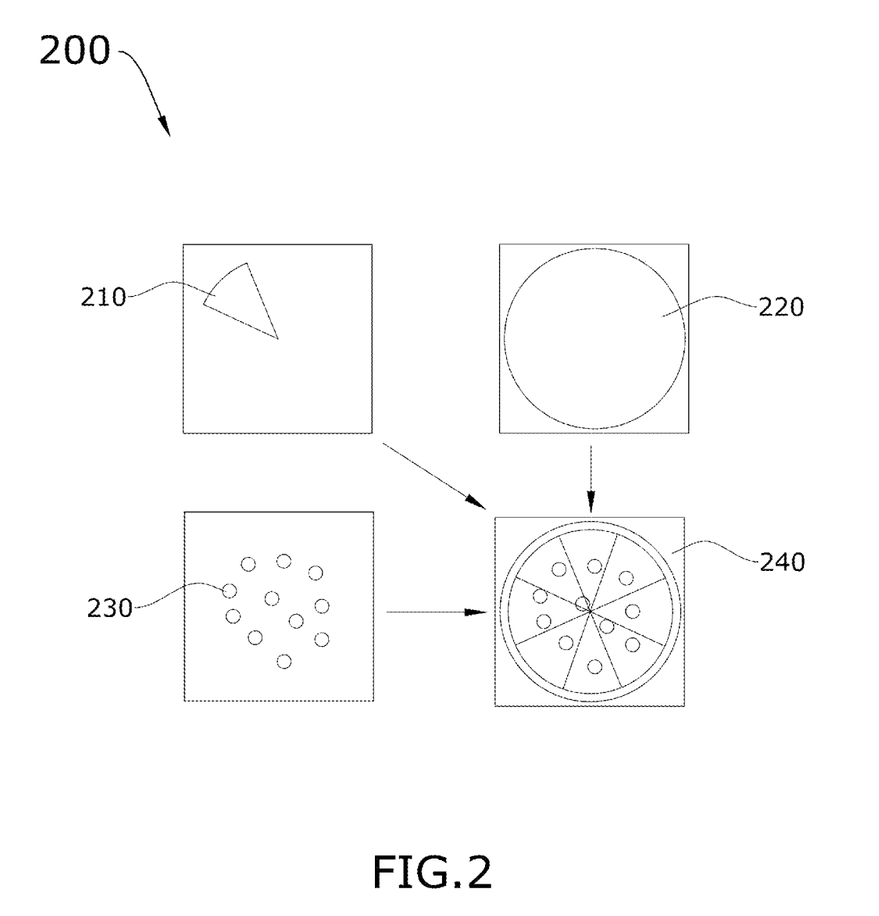
FIG. 2 conceptually illustrates a communal/familial structure in some embodiments in which a plurality of 'parent' images whose shared dialect can recreate a composited 'child' image automatically.
Figure 4:
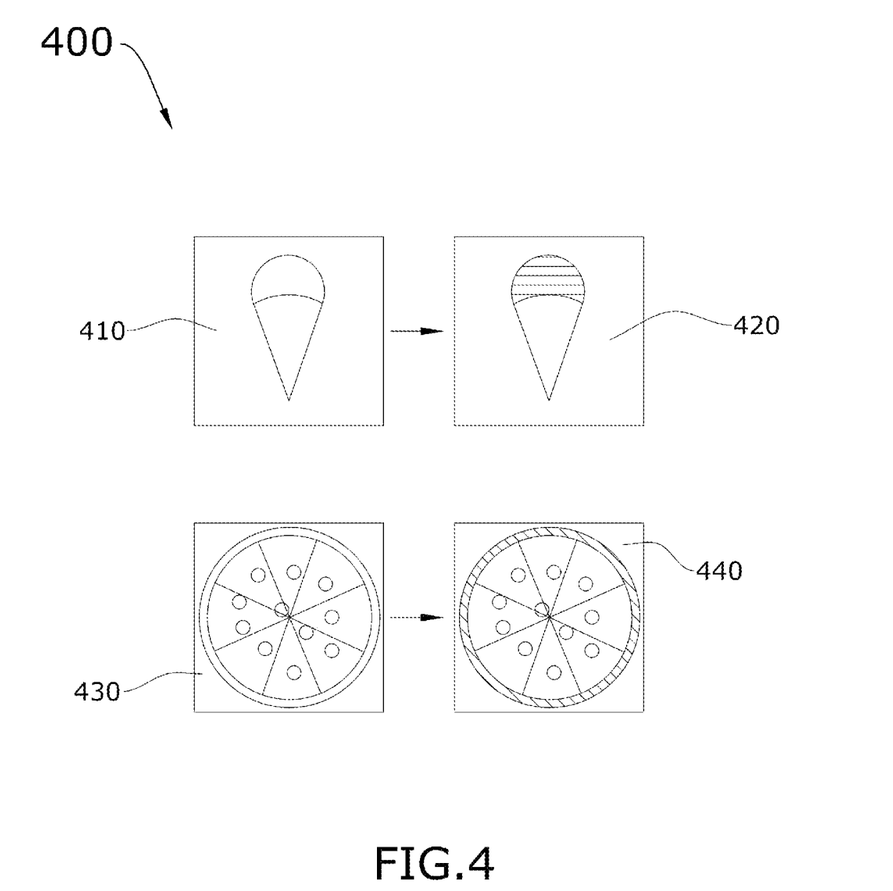
FIG. 4 conceptually illustrates applications at the community level—heritage in some embodiments in which the result of a digital dialect is being used to apply consistent manipulation across multiple creative works.

By way of example, FIG. 2 conceptually illustrates a communal or familial structure 200 in which a plurality of 'parent' images whose shared dialect can recreate a composited 'child' image automatically. As shown in this figure, at the point of inception, the image/person declares its relative origin, as either being an original 'parent' with no ancestry, demonstrated here as a parent slice image 210, a parent base pie image 220, and a parent toppings image 230, or as a 'child' which was derived from other parents, specifically, a child pizza pie image 240. A plurality of related original images, which include the parent images with no ancestry (i.e., the parent slice image 210, the parent base pie image 220, and the parent toppings image 230), along with their respective descendants (in this figure, just one derived child is shown, namely, the child pizza pie image 240), comprise a basic 'family' unit. Note, the family unit could include other child derivations, such as a child image derived from the parent slice image 210 and the parent base pie image 220, but no toppings 230. In some embodiments, family units share the same dialect with other families to describe relative relations across a larger community. With an understanding of the communal relationships, the dialect can be used to recreate new 'descendants' while introducing variations of heritage in the form of a consistent visual style that can span members of the community, which is shown in FIG. 4 with varied heritage of members 420 and 440 to members 410 and 430, respectively, yet members 420 and 440 remains consistently stylized. This is described further below, by reference to FIG. 4.

Inferred Communal Dialect.

In some embodiments, the communal dialect uses an aggregated role definition that is anchored in anticipation of dynamically manipulating multiple and otherwise unrelated visual works. Defining the dialect prior to the first artistic point of inception enables the language to be shared. The avoidance of any literal stylistic definition within the dialect can shift the literal stylization to downstream systems. For example, the use of 'color1' instead of 'blue', can shift the style choice for 'color1' downstream, where 'blue' (or another color) can be defined for 'color1'.

By way of example, the aggregated communal role definition can be represented in the following declaration: family1_color1_hair.gif, family1_color1_eyeBrows.gif, family2_color1_hair.gif, family2_color1_eyeBrows.gif, family2_color2_beard.gif, and family2_color2_mustache.gif. The use of inference to interpret the aggregated communal role is introduced as the definition encompasses combinations that otherwise cannot be generically interpreted. For example: parent_face.gif, parent_face1.gif, parent_faceX.gif has no obvious instruction outside of the embodiment (aggregated communal role definition).

Self-Declared Visual Role.

In some embodiments, an image can self-declare its own visual role at any point during its lifetime. By way of example, FIG. 3 conceptually illustrates a self-declared visual role 300 that results from an image that declares its intended role within a plurality of other unknown images. As shown in this figure, a parent light bulb image 310 and a parent glow image 320 have derived child images 330 and 340. However, using a file name 'child_glow.jpg' for the glow image 320, provides an aggregated role definition that declares: family origin, aesthetic purpose, and relevant pixels. This aggregated role definition can be leveraged when using the image in isolation or in the context of a family, community, and/or product; and can be visually manipulated in that context in order to stay true to its declared role to 'glow' as shown in the derived child images 330 and 340, even as its surrounding community members change. Specifically, the background of the derived child image 330 is light while the background of the derived child image 340 is dark, yet the 'glow' adjusts to the change in the surrounding community members by affecting a light 'glow' against the change in background from light to dark.

Declaration at the File Level.

In some embodiments, the aggregated role definition can comprehensively exist within its self-declaration because the base unit of the communal dialect starts at the point of inception of a single file/person. The file itself is the only thing needed in order to infer its visual purpose, its aesthetic relevancy, and its communal relationships.

In some embodiments, resiliency is achieved by declaring the communal dialect in the filename of the image, and can then evolve through pixel transformations across any number of image processing software systems without the loss of the aggregated role definition. With the resiliency of the aggregated role definition intact, a plurality of images can then be transferred to any given creative and/or delivery environment where the stylistic inference can be recreated or further enriched.

Applications at The Community Level—Heritage (Ethnic).

In some embodiments, inference among a plurality of images can be used to trace ancestry all the way to the point of inception. This inference can then leverage the purest form of self-declared aesthetic intent in a reconstructive manner to recombine images into a new lineage tree with a different stylistic outcome.

By way of example, FIG. 4 conceptually illustrates applications at the community level-heritage 400 in which the result of a digital dialect is being used to apply consistent manipulation across multiple creative works. As shown in this figure, leveraging image family heritage along with the shared communal dialect, images that make up different works, such as the differing images 410 (ice cream cone) and 430 (pizza pie), can be transformed to produce a unified, consistent, branded style, as shown in the styled images 420 (ice cream cone with shading) and 440 (pizza pie with shading), being connected (shown by arrows) to images 410 and 430, respectively, to demonstrate changes in style along family heritage. Furthermore, this is supported (and shown to be occurring) across a plurality of otherwise unrelated images (e.g., non-food and unrelated vehicle image and vehicle image with shading applied).

Dynamic Nature/Application-Real-Time Product Visualizers.

Figure 5:
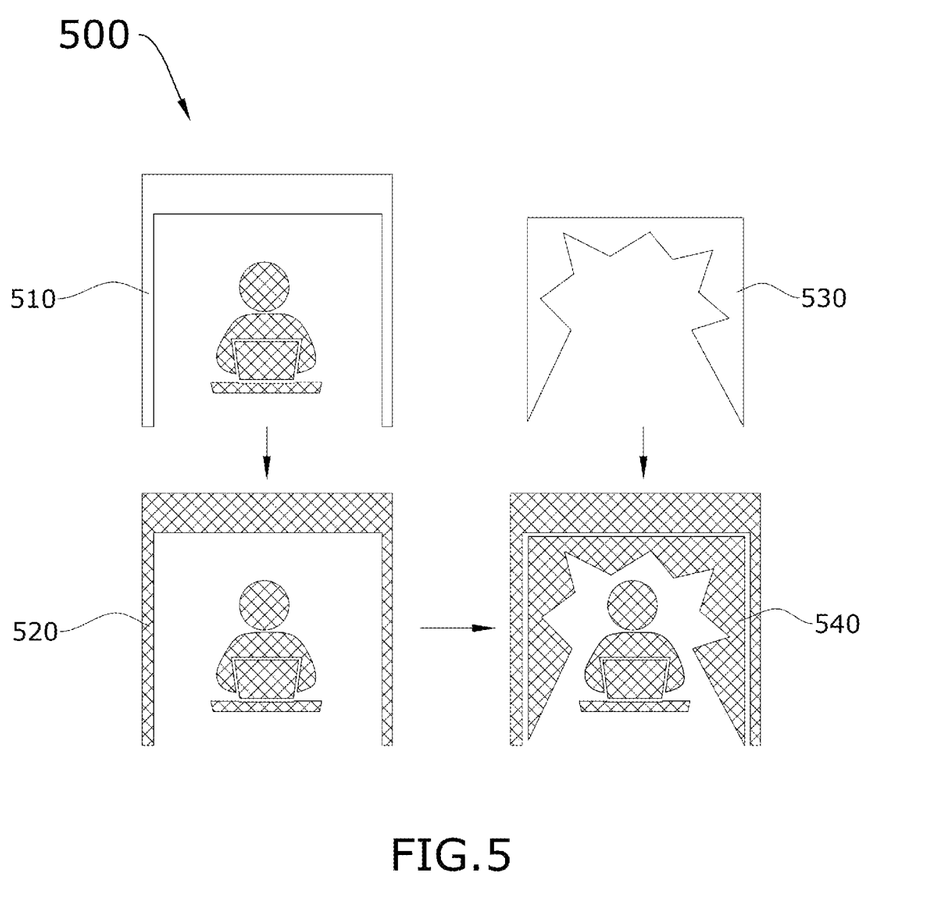
FIG. 5 conceptually illustrates dynamic nature/application—real-time product visualizers in some embodiments and the result of a digital dialect shared between the product and the image to provide an aesthetic transition (frame) between the two.

In some embodiments, a content author can use product visualizers to see the impact of stylistic declarations during the act of creation because the dialect of the aggregated role definition can be transferred to other image processing software and delivery systems. For example, the content author may use product visualizers, such as shown by the glow applied to derived child image 330 with light background and derived child image 340 with dark background, described above by reference to FIG. 3. Similarly, this is shown by way of example in FIG. 5, which conceptually illustrates dynamic nature/application—real-time product visualizers 500 and the result of a digital dialect shared between the product and the image to provide an aesthetic transition (frame) between the two. Specifically, product visualizers and transitions between 530 and 540, in order to see the impact of their stylistic declaration, such as the stylistic declaration for glow image 320 shown in FIG. 3, during the act of creation.

Acceleration of Collaboration.

In some embodiments, content creators can collaborate on a dynamically-shared, visually-branded style while contributing to the community with either a parent or child image because the dialect of the aggregated role definition can be shared across a plurality of 'family' images as well as other 'family' members within a community. For example, content creators can collaborate on the dynamically-shared, visually-branded style 420 and 440, described above by reference to FIG. 4, while contributing to the community with either the parent image (e.g., parent slice image 210, parent base pie image 220, parent toppings image 230) or the child image (e.g., child pizza pie image 240), which are described above by reference to FIG. 2.

Separation and Securing of Stylistic Themes.

In some embodiments, the power to apply the final stylistic look can be can be passed to the dialect's interpreter because the dialect of the aggregated role definition can articulate stylistic intent through abstraction. The definitional separation of the final style of 'Halloween' or 'Christmas', for example, means that stylistic algorithms can be secured autonomously in external systems, decoupled from the files themselves. This creates new types of intellectual property definitions that can be provided as pure stylistic-algorithms. These external algorithms can be applied to any new images the declare the shared aggregated role definition (e.g., via a stylistic intent manager module).

Licensing of Image Feeds and Enrichment.

Figure 3:
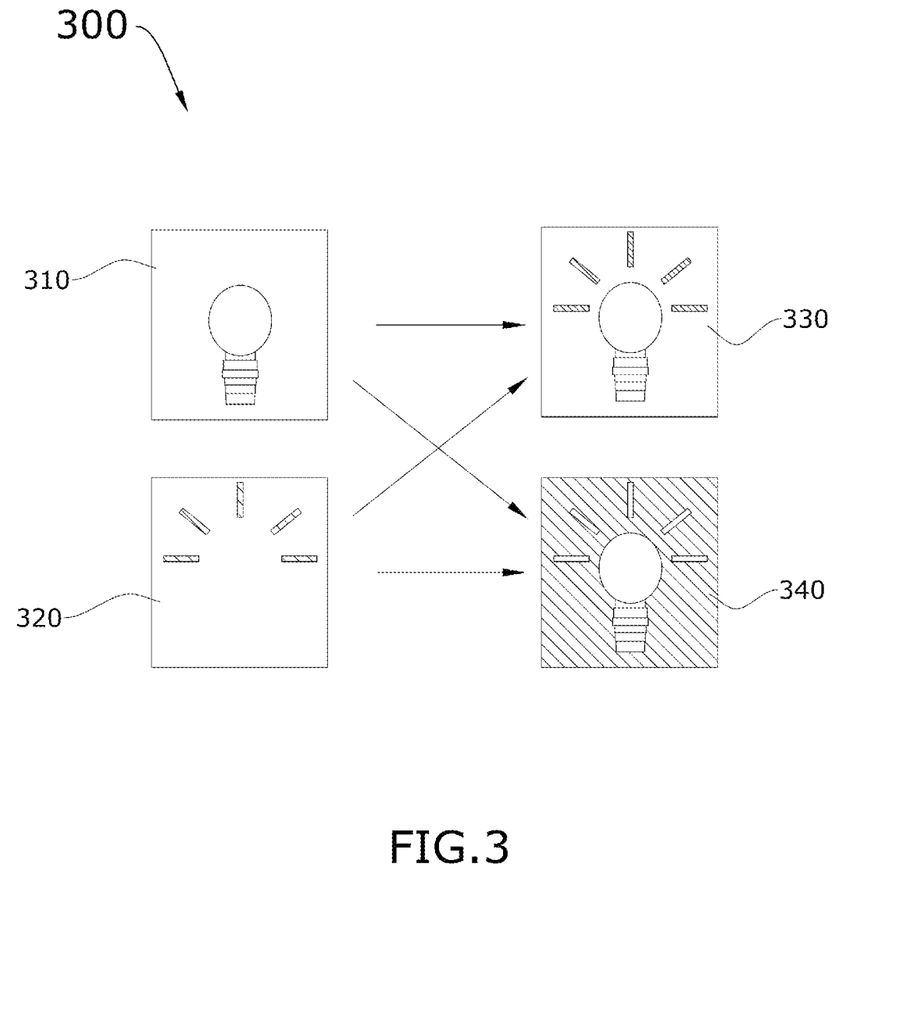
FIG. 3 conceptually illustrates a self-declared visual role in some embodiments that results from an image that declares its intended role within a plurality of other unknown images.

In some embodiments, content creators can secure their creative intellectual property at any point in the lineage chain by using the self-declared aggregated role definition. For example, and by reference to FIG. 2, a creator can retain license rights to their 'parent' members, parent slice image 210, parent base pie image 220, and parent toppings image 230, while choosing to share their 'child' derivatives, such as child pizza pie image 240. Referring to FIGS. 3 and 4, content creators can also secure and license various dialect interpreters (shown in connection with derived child image 330 with light background and derived child image 340 with dark background) to provide new value offerings that enrich the family and community stylization (shown in connection with ice cream cone with shading image 420 and pizza pie with shading image 440).

Product Integration.

In some embodiments, a delivery system can dynamically recreate stylistic intent within the context of a product. This is due to the fact that the dialect of the aggregated role definition can be shared with the delivery system, thereby ensuring that the delivery system can dynamically recreate the stylistic intent within the context of that product. For example, and referring now to FIG. 5, the visual aesthetic of an external background can be blended into the dynamically stylized images 530 and 540. This approach solves the problem in which changes to the background color of a website, for example, leave the images in the website visually disconnected as distinct squares 510 and 520. Furthermore, this allows the delivery system to adhere to unique customer demographics by possibly producing different visual variations per visit; each of which respects the self-declared aesthetic intent contained in the base image.

Personalization.

The fact that the dialect of the aggregated role definition can be shared with the delivery system means that the delivery system can utilize unique customer preferences to produce different visual variations that connects the customer's desire to the original creator's artistic intent, resulting in a unique stylistic combination that allows both the producer and consumer to have had influence on the final outcome.

To make the digital language, the process for defining the digital language, and the image and brand style system of the present disclosure, a person may have a visual impairment (e.g., either low-vision or colorblindness), which presents certain stylistic challenges, and therefore, a need arises to address these challenges, such as making and deploying the digital language, the process for defining the digital language, and the image and brand style system of the present disclosure. Now, to design, code, and otherwise make this digital language, the process for defining the digital language, and the image and brand style system, a developer or designer may have (or otherwise obtain) a deep knowledge of image compositing and media metadata studies. The person would code one or more implementations via programming paradigms, systems, and/or web technologies (e.g., Javascript, CSS, HTML). The person would also need to leverage experience (or otherwise obtain or be instructed) in digital media delivery and creative production. From there, the person developing the system would write code to unleash the current constraints of static digital images by making them dynamic. The person may then work to create new media pieces that would validate the process.

To use the digital language, the process for defining the digital language, and the image and brand style system of the present disclosure, a visual production user accelerates their time-to-market by creating and/or using pre-defined metadata models that articulate their subject (e.g., toys, fashion, characters). By conforming their output files to the convention of the models, controls can be used to dynamically style and present variations. This allows multiple 'style guides' to be created. This media can be distributed and changed in real time, either by updating the input style of the medium (e.g., website) and/or by giving the style control to the end user to create a customized, personal experience, where each customer can have a unique variation of the stylized image(s). Anyone producing a digital product can use the digital language, the process for defining the digital language, and/or the image and brand style system to instantly change their branded style (e.g., change visual theme for a holiday or change colors to match their favorite sports team).

Additionally, the digital language, the process for defining the digital language, and the image and brand style system can be helpful to those with visual impairments (e.g., a person with color blindness). The digital language, the process for defining the digital language, and the image and brand style system allows anyone, including those with (or without) visual impairments, to modify color palettes in order to see creative design. Additionally, the digital language, the process for defining the digital language, and the image and brand style system can be used in any digital, rendered visual experience, e.g., virtual amusement parks, digital billboards, restaurant menus, etc. The same approach could be used in medical imagery systems. If there is a language descriptor (Model) for each layer (perhaps organ) of visual information (Style), then the presentation (Output) of the imagery could be dynamically controlled/updated/ changed similar (Control) to a commercial brand.

Many of the above-described features and applications are implemented as software processes that are specified as a set of instructions recorded on a computer readable storage medium (also referred to as computer readable medium, non-transitory computer readable medium, and/or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, firmware, EPROMs, etc. The computer readable media does not include carrier waves and electronic signals passing wirelessly or over wired connections.

In this specification, the term "software" is meant to include logic residing in memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
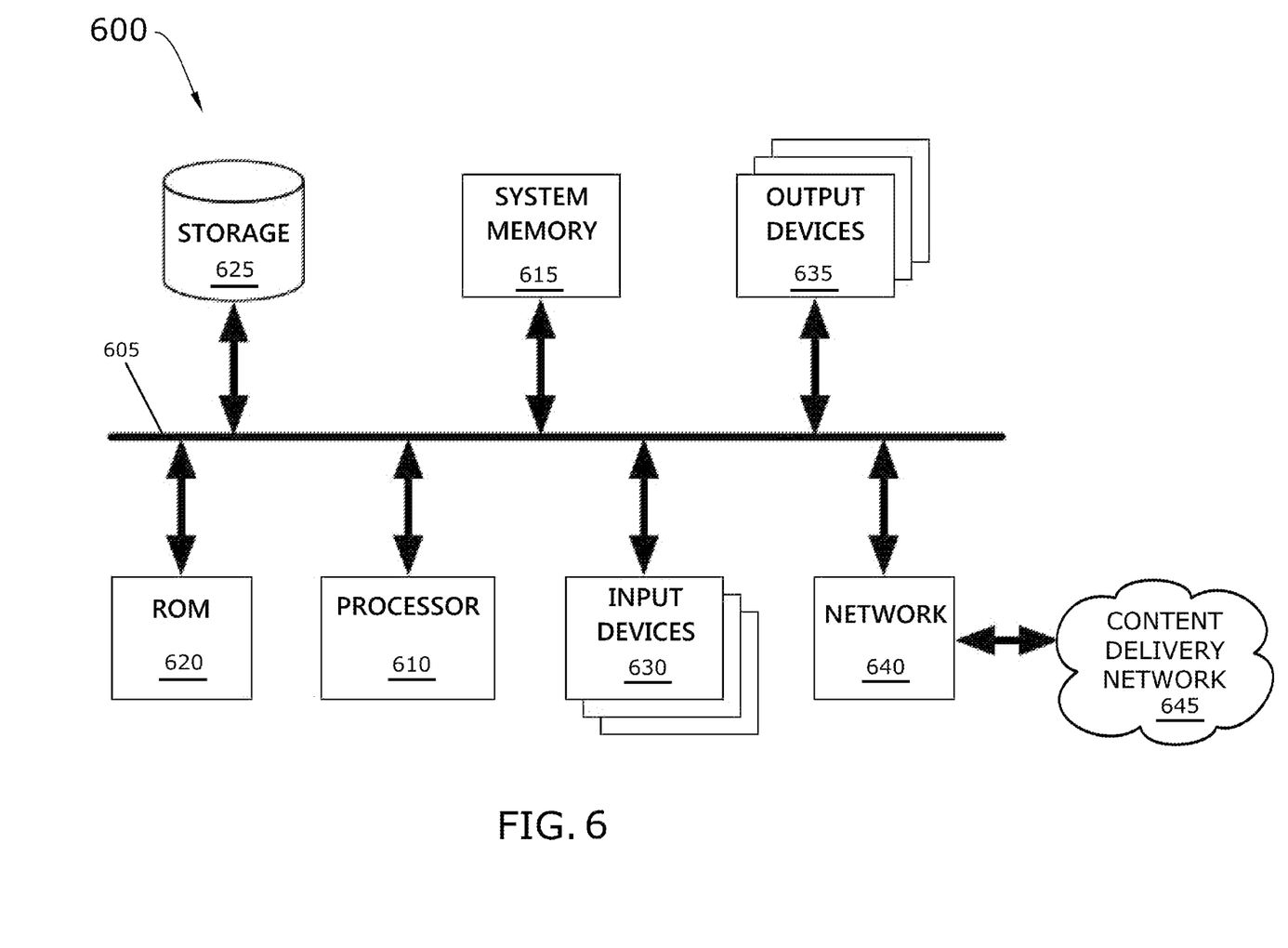
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, wearable, or any other sort of electronic device. Such an electronic system includes various types of computer readable media and interfaces for various other types of computer readable media. As shown in this figure, the electronic system 600 includes a bus 605, processing unit(s) 610, system memory 615, read-only memory 620, a permanent storage device 625, input devices 630, output devices 635, and a network 640 (accessible via a network adapter). The network adapter (not shown), enables the electronic system 600 to connect to the network 640. Through the network 640, the electronic system 600 can connect to and access a content delivery network 645.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

Some embodiments of the invention use a mass-storage device (such as a magnetic or optical disk and its corresponding disk drive) as the permanent storage device 625. The read-only-memory (ROM) 620 can store static data and instructions that are needed by the processing unit(s) 610 and other modules of the electronic system. The permanent storage device 625 and the content delivery network (CDN) 645, on the other hand, are read-and-write memory devices. This device is a non-volatile memory unit that stores instructions and data even when the electronic system 600 is off.

Other embodiments use a removable storage device (such as a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, the read-only memory 620, and/or the content delivery network (CDN) 645. For example, the various memory units include instructions for processing stylistic appearance alterations of images and families or communal groups of images displayable on screens, such as liquid crystal display (LCD) screens and organic light emitting diode (OLED) display screens in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 include printers and display devices, such as liquid crystal displays (LCD), organic light emitting diode (OLED) displays, or wearable display devices, such as virtual reality (VR) headsets and augment reality (AR) eyewear devices. Some embodiments include devices such as a touchscreen that functions as both input and output devices. Some embodiments are configured to use document object models (DOM) for output.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet or a content delivery network 645). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices or wearables. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, or non-transitory computer readable media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A process for defining a digital language that enables Style, Output, Control, and Model (SOCM) aspects in an image and brand style system in which the digital language universally describes stylistic intent across multiple image files to enable an image delivery medium to change visual style across all images and branded content using a new and consistent style/palette without a loss of aesthetics, said process for defining a digital language comprising:

specifying characteristics of a visual image of a collection of rasterized images using an image processing application;

identifying stylistic elements of the visual image;

saving a separate element file for each identified stylistic element;

determining a suitable file naming convention;

updating a file name of each separate element file according to the suitable file naming convention;

providing, by one of distributing and uploading, a group of files to a visual medium created with an original stylistic intent and configured to deliver the visual image and the collection of rasterized images in a particular stylistic palette, wherein the visual medium comprises at least one of a product and a website, wherein the group of files comprises the separate element files for the identified stylistic elements;

changing a desired style definition for the collection of images, wherein the change in desired style definition enables automatic visual morphing of the desired style definition for the collection of images to an updated style of the visual medium that respects the original stylistic intent; and repeating the step for changing the desired style definition as needed by visual design requirements.

2. The process for defining the digital language that enables SOCM aspects in the image and brand style system of claim 1 further comprising applying each of the steps for specifying characteristics, identifying stylistic elements, saving the separate element file, determining the file naming convention, updating the file name, and providing the group of files to a plurality of other visual, rasterized images of the collection.

3. The process for defining the digital language that enables SOCM aspects in the image and brand style system of claim 2 further comprising displaying the visual image and the plurality of other visual, rasterized images according to the original stylistic intent.

4. The process for defining the digital language that enables SOCM aspects in the image and brand style system of claim 3, wherein the visual image and the plurality of other visual, rasterized images are displayed in the visual medium for both the product and the website.

5. A non-transitory computer readable medium storing a stylistic intent image collection definition program which, when executed by a processor of a computing device, defines and uses a digital language to publish an image collection of an intended stylistic aesthetic, said stylistic intent image collection definition program comprising sets of instructions for:

authoring an image collection using a generic style, wherein the image collection comprises a plurality of pixel-based, rasterized images;

identifying strategic style elements in the authored image collection;

separating the strategic style elements after identifying the strategic style elements in the authored image collection;

naming elements in the authored image collection using a desired language dialect;
receiving input to change the generic style;
changing the generic style based on the received input;
utilizing a management function that provides global control via a data model to change style combinations of all images in the image collection;
dynamically changing, via utilizing the data model for global control, the generic style across various style combinations for all images in the image collection;
visually outputting a visual result of the changed style;
determining whether a desired aesthetic is achieved by the change in the generic style; and
publishing a newly branded collection when the desired aesthetic is achieved.

6. The non-transitory computer readable medium of claim 5, wherein the set of instructions for naming elements in the authored image collection using the desired language dialect comprises naming the separated strategic style elements.

7. The non-transitory computer readable medium of claim 5, wherein determining whether the desired aesthetic is achieved comprises determining whether an affirmative input is made by a user after the user inspects the visual result.

8. The non-transitory computer readable medium of claim 7, wherein the set of instructions for determining whether an affirmative input is made by the user comprises repeatedly determining whether the affirmative input is made by the user after the user inspects the visual result in multiple images of the image collection.

* * * * *